United States Patent

Wu et al.

Patent Number: 5,576,982
Date of Patent: Nov. 19, 1996

[54] FAST SIGNIFICANT BIT CALCULATOR AND ITS APPLICATION TO INTEGER MULTIPLICATION AND DIVISION

[75] Inventors: Gary C. Wu, Wayne; Steven H. Leibowitz, Norristown; Chandra S. Pawar, Harleysville, all of Pa.

[73] Assignee: Unisys Corporation, Blue Bell, Pa.

[21] Appl. No.: 323,780

[22] Filed: Oct. 17, 1994

[51] Int. Cl.⁶ ................................. G06F 7/00; G06F 7/52
[52] U.S. Cl. ............................ 364/715.1; 364/757
[58] Field of Search .................... 364/715.04, 715.1, 364/736, 754, 757, 759, 761, 764, 766, 745, 748

[56] References Cited

U.S. PATENT DOCUMENTS

| | | | |
|---|---|---|---|
| 4,413,326 | 11/1983 | Wilson et al. | 364/748 |
| 4,488,252 | 12/1984 | Vassar | 364/748 |
| 4,615,016 | 9/1986 | Bradley et al. | 364/756 |
| 4,782,457 | 11/1988 | Cline | 364/715.04 |
| 4,817,047 | 3/1989 | Nishitani et al. | 364/754 |
| 4,887,232 | 12/1989 | Wolrich et al. | 364/754 |
| 4,942,606 | 7/1990 | Kaiser et al. | 380/4 |
| 4,943,941 | 7/1990 | Harriman, Jr. | 364/748 |
| 4,956,801 | 9/1990 | Priem et al. | 364/748 |
| 4,959,860 | 9/1990 | Watters et al. | 380/4 |
| 4,979,139 | 12/1990 | Nakayama | 364/715.01 |
| 5,161,117 | 11/1992 | Waggener, Jr. | 364/715.03 |
| 5,241,490 | 8/1993 | Poon | 364/715.04 |
| 5,265,259 | 11/1993 | Satou et al. | 395/800 |
| 5,272,660 | 12/1993 | Rossbach | 364/748 |
| 5,420,809 | 5/1995 | Read et al. | 364/715.01 |

Primary Examiner—Roy N. Envall, Jr.
Assistant Examiner—Chuong D. Ngo
Attorney, Agent, or Firm—John B. Sowell; Mark T. Starr; John F. O'Rourke

[57] ABSTRACT

Disclosed is a Significant Bit Calculator (SBC) for determining the number of significant bits or nibbles of an operand in one clock period, and for using the result in performing binary arithmetic operations, such as multiplication and division. By determining the exact size of the operand in one clock cycle, the time spent on processing leading zeros is eliminated. The SBC can be implemented with combinational logic circuitry to compute the number of significant bits or nibbles in a single clock cycle regardless of the number of leading zeros and without any firmware or counter. The time saved using the SBC is proportional to the size of the operand.

14 Claims, 4 Drawing Sheets

FAST SIGNIFICANT BIT CALCULATOR AND ITS APPLICATION TO INTEGER MULTIPLICATION AND DIVISION

FIELD OF THE INVENTION

The present invention relates generally to data processing methods and apparatus, and more particularly to a Significant Bit Calculator (SBC) that determines the number of significant bits (i.e., the number of bits excluding leading "0"s) of an input word and returns this count in one clock cycle. Presently preferred uses of this invention are in performing binary multiplication and division.

BACKGROUND OF THE INVENTION

The following discussion of the background of the present invention refers to multiplication. However, because division can be performed as a series of subtractions, just as multiplication can be performed as a series of additions, the discussion can be related to division with minor modification.

A digital processor hardware designer faces two choices when he or she is required to include a multiplication function in his or her design: The function can be performed (1) by a hardware multiplier or (2) by software or micro-code using a conventional ALU (arithmetic and logic unit). In most cases, the ALU already exists in the design and is used to support other functions. On the other hand, a hardware multiplier is very complex and expensive in terms of gate count and board space required. Therefore, a hardware multiplier is not a popular choice unless the design requires very high performance and is not cost sensitive. Using a conventional ALU with micro-code or software help to perform one-bit-at-a-time multiplication is a very common practice. See Chapter 3 of "Digital Computer Arithmetic" by Cavanagh, 1984, McGraw-Hill, Inc., for multiplication algorithms. Chapter 4 of the same book has similar algorithms for division.

The size of the multiplier must be known before performing a one-bit-at-a-time multiplication function. In most designs, the size of the multiplicand must also be known so that the two input operands and the output result word can be placed in two registers instead of three, thereby increasing the speed of the multiplication operation. For example, the following algorithm is used for multiplication:

Step 1: Initialize the result word to zero and set the current bit pointer to point to the MSB of the multiplier.

Step 2: Shift the result word one bit to the left, effectively multiplying it by two.

Step 3: If the current bit is a one, the multiplicand is added to the result word.

Step 4: If the current bit is the LSB of the multiplier, go to step 5. Otherwise, move the current bit pointer one bit position toward the LSB in the multiplier and go to step 2.

Step 5: This is the end of the multiplication—the result word contains the product of the multiplication.

In this procedure, steps 2 to 4 must be performed for each bit of the multiplier. These three steps typically will take several micro-code instructions to perform. If each of the instructions takes one clock to execute, the cost of multiplication will be several clocks per bit.

The Unisys Corporation (the present invention is assigned to Unisys Corporation, Blue Bell, Pa.) Common Input Output Module (CIOM) Sequencer uses an enhanced ALU to allow a special "multiply-assist" instruction to perform steps 2 through 4 in one clock. However, even at this one-clock-per-bit speed, a 20-bit wide multiplier still needs 20 clocks to complete a multiplication function, excluding the initial overhead of setting up the operands and the current bit pointer. Although this is the fastest possible speed with a one-bit-at-a-time multiplication algorithm, it is still very slow compared to a one-clock addition or subtraction function supported by the same CIOM Sequencer.

The dominant limitation on the speed of a one-bit-at-a-time multiplication operation is the size of the multiplier (in bits). The present invention was made in the process of attempting to make the multiplication operation faster by reducing the size of the multiplier. A multiplier is usually acquired from a storage device somewhere in the design or obtained as the result of a previous calculation. A micro-code programmer usually knows the largest possible size of this operand. Its exact size is unknown and can vary each time the same code stream is executed. Algorithms for determining the exact size of an operand are not much faster than processing the bits through the multiplication algorithm described above. It typically takes one clock or more to eliminate each leading zero bit. Therefore, micro-code programmers assume the worst case multiplier size when implementing a multiplication function.

U.S. Pat. No. 4,615,016, Sep. 30, 1986, titled "Apparatus For Performing Simplified Decimal Multiplication By Stripping Leading Zeroes," discloses a BCD (binary coded decimal) multiplication unit that uses firmware to compute significant digits. The patent discloses that a counter register is initially loaded with the maximum width of an operand (e.g., 16 bits), and then a microinstruction loop is executed to scan the operand one digit at a time starting from the most significant digit. Each trip through the loop checks a single digit for zero and the counter is decremented by one if a zero is detected. The loop is repeated for each digit until a non-zero digit is encountered or there are no digits left to check. At the end of this process, the counter register contains the number of significant digits. This process is relatively slow, its speed being inversely proportional to the number of leading zeros in the operand.

SUMMARY OF THE INVENTION

A primary goal of the present invention is to provide a method and apparatus for rapidly (e.g., in one clock period) determining the number of significant bits of an operand, and for using the result in performing binary arithmetic operations, such as multiplication or division.

With a Significant Bit Calculator (SBC) (also called a "Fast Significant Bit Logic Unit") in accordance with the present invention, the exact size of an operand (i.e., number of significant bits) can be determined in one clock, thereby eliminating the time spent on processing leading zeros. The time saved using the SBC is proportional to the size of the operand. For a fast one-clock-per-bit multiplication circuit, the average time saved on an X-bit multiplier is $(X/2)-1$ clocks. The time saved is $(X/2) \cdot Y - 1$ clocks for a multiplier circuit that takes Y clocks per bit to eliminate leading zeros.

The following aspects of this invention are seen in the presently preferred embodiments disclosed hereinbelow:

(1) The concept of a significant bit calculation function and its implementation in hardware.

(2) The usage of a Significant Bit Calculator to greatly enhance the speed of multiplication and division by eliminating the need to process insignificant leading zeros through micro-code or software.

(3) A barrel shifter that takes the result of the Significant Bit Calculator and positions the input operands for a multiplication or division function.

An advantage of the present invention is that it can be implemented with combinational logic circuitry to compute the number of significant bits in a single clock cycle, regardless of the number of leading zeros and without any firmware or counter. This is a great advantage considering the large operand widths currently available (e.g., 32-bit, 64-bit, and larger). In addition to these design/performance advantages, another advantage of this invention is that, in one preferred embodiment, it is implemented as an independent logic function triggered by a microcode instruction as an independent operation, and not only as an integral part of a multiplication or division operation. This allows the invention to be used for purposes other than multiplication or division. Other features and advantages of the present invention are disclosed below.

DETAILED DESCRIPTION OF PREFERRED EMBODIMENTS

Figure 1:
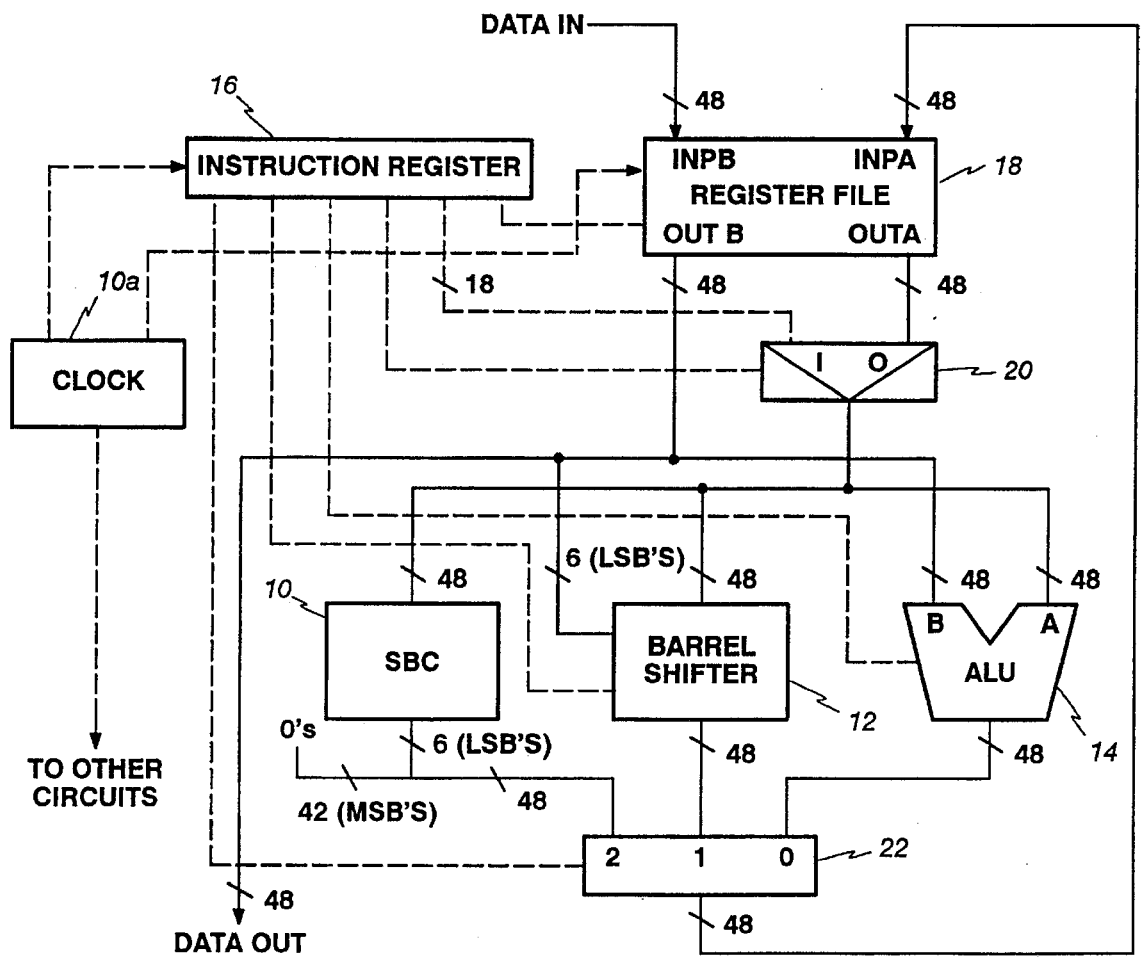
FIG. 1 is a block diagram of a data processor comprising a Significant Bit Calculator in accordance with the present invention.

FIG. 1 is a block diagram of a data processing circuit employing a Significant Bit Calculator in accordance with the present invention. The data processing circuit includes an SBC 10, a system clock 10a, a barrel shifter 12, an ALU 14, an instruction register 16, a register file 18, a first multiplexor ("mux") 20, and a second mux 22. Two embodiments of the SBC 10 are described below. The first embodiment, depicted in FIG. 2A, determines the number of significant bits. The second embodiment, depicted in FIG. 2B, determines the number of significant nibbles. In this example, the register file 18 contains a plurality of general purpose registers, denoted R1 to RN, where N is the total number of registers. The register file is a four-port device, which means that up to two registers can be read and another two written at the same time. The information contained in each instruction (in instruction register 16) can be viewed as control signals connecting the instruction register to the devices shown in FIG. 1. These control signals are drawn as dotted lines. Operands of operations are supplied to the register file, and the results of operations are returned to the register file, as described below. Note that the SBC/SBN itself does not use a clock signal. Only registers (the instruction register and the register file in FIG. 1) use clocks. Performing an SBC operation in a single clock means that, when instructed to perform a calculation by the instruction register, the SBC is capable of receiving its input from the register file, completing the calculation, and getting the result word back into the register file before the next clock pulse arrives at the register file.

The ALU 14 in this embodiment supports a complete set of logic operations and five types of integer arithmetic operations, including addition, subtraction, multiply-assist, divide-assist, and restore. The last three arithmetic operations are multiplication and division assistance operations in performing a one-bit-at-a-time multiply and divide using a fixed-point, non-restoring algorithm. (In non-restoring division, the remainders may be positive or negative.) The multiply and divide operations are not ordinary multiplication and division operations; they are one-bit-at-a-time multiply-assist and divide-assist operations. The restore operation is used in conjunction with the divide operation to finish a multiple clock division.

The multiply-assist operation is a one-bit-at-a-time operation in which "N" operations are needed to complete a multiplication with an N-bit multiplier. Operands must be aligned properly before the first multiply-assist operation can be performed. The multiplier must be left justified and the multiplicand must be right justified. The total number of bits of the operands must be less than or equal to the word size defined by the current architecture. This means that a micro-code programmer must determine the largest possible size of each operand. This determination is made with the Significant Bit Calculator 10.

The multiply-assist operation can be implemented as a one clock "shift and conditional add" function. The left justified multiplier is shifted one bit to the left first. If the shift-out bit off the MSB is a one ("1"), the multiplicand is added to the shifted multiplier; otherwise, the shifted multiplier itself is passed to the ALU output. This ALU output becomes the new multiplier for the next multiply-assist operation. For an N-bit multiplier, N multiply-assist operations are required to complete the whole multiplication. The result of the completed multiplication is the ALU output of the last multiply-assist operation.

The divide-assist operation in this example is a one-bit-at-a-time operation. N divide-assist operations plus one restore operation are needed to complete a division with an N-bit dividend. Operands must be aligned properly before the first divide-assist operation can take place. The dividend must be right justified in a register and the divisor left shifted in another such that the LSB of the divisor lines up one bit position to the left of the MSB of the dividend. The Significant Bit Calculator 10 is used in determining the sizes of the operands. An ALU carry-out flag is preset to a "1" by micro-code before executing the first divide-assist operation.

The divide-assist operation is implemented as a one clock "shift, conditional subtract, and set carry-out" function on the ALU. The dividend is first shifted one bit to the left. If the carry-out flag is a one ("1"), the word containing the divisor is subtracted from the shifted dividend; otherwise, it is added to the dividend. In either case, the new carry-out generated from the subtraction or the addition is used to replace the LSB of the ALU result word. This result word becomes the new dividend for the next divide-assist operation. The total number of divide-assist operations required is equal to the number of bits the divisor was shifted before the first divide-assist operation. In other words, this sequence of operations ends when the LSB of the dividend lines up with the LSB of the divisor.

A "restore" operation can be performed by microcode at this point to finish the division function. This restore operation includes a "conditional add" function on the ALU. The divisor word is added into the dividend if the carry-out at the end of the last divide-assist operation is "0"; otherwise, a no-op (a "Pass-A" operation that passes the dividend through the ALU and back into the register file) is performed. The result of the complete division function, including both the quotient and the remainder, is now contained in the result word of the restore operation. The quotient occupies the right hand side of the result word with its LSB at bit zero of the result word and its MSB at bit N−1, where N is the number of bits the divisor is shifted at the beginning of the division. The remainder occupies the left hand side of the result word with its LSB at bit N and its MSB at N+X−1, where "X" is the total number of bits of the divisor. In other words, the remainder takes up the same number of bits as the divisor and sits at the same position in the result word as the shifted divisor in the divisor word. The quotient takes up all the bits to the right of the remainder in the result word. The total number of bits of the quotient and the remainder together equals to the total number of bits of the original dividend.

In the following examples of multiplication and division, 16-bit words are used.

EXAMPLE 1: Multiplication

Assume:

Multiplicand=0000 0000 0000 1101 (13).

Multiplier=0000 0000 0000 0101 (5).

As described above, the multiplication procedure used in this example requires that the multiplier be left justified in one data register and the multiplicand right justified in another. Before the multiplication function begins, the micro-code uses the SBC 10 (FIG. 1) to determine that the width of the multiplier is four (4) bits. It then calculates the number of bit positions the multiplier should be shifted by the ALU. This number is 16−4=12. The barrel shifter is then used to shift the multiplier 12 bits to the left.

The multiplication function is then started with the multiplier left-justified and the multiplicand right-justified. This function is performed as a series of shift-and-addition operations on the multiplier. The addition is a conditional operation. It is executed only if the output of an SO (shift-out) flip flop (not shown) is "1". Otherwise, nothing is done to the multiplier. Since the multiplier has four (4) significant bits, four shift-and-add operations must be performed. The ALU 14 performs this shift-and-add operation in a single clock.

The multiplication process is illustrated below on a clock by clock basis. Note that the SO flip-flop is initialized to zero at the beginning.

| Step | SO | Multiplier | Multiplicand |
|---|---|---|---|
| initial state clock #1 | 0 | 0101 0000 0000 0000 | 0000 0000 0000 1101 |
| shift add—>no op clock #2 | 0 | 1010 0000 0000 0000 1010 0000 0000 0000 | |
| shift | 1 | 0100 0000 0000 0000 | |
| add clock #3 | | 0000 0000 0000 1101 0100 0000 0000 1101 | |
| shift add—>no op clock #4 | 0 | 1000 0000 0001 1010 1000 0000 0001 1010 | |
| shift add | 1 | 0000 0000 0011 0100 0000 0000 0000 1101 0000 0000 0100 0001 | |

In the above table, the final content of the multiplier register represents the result of the multiplication. In this case, the result is, 0000 0000 0100 0001=65 (i.e., 13×5=65).

EXAMPLE 2: Division

Assume:

Dividend=0000 0000 0000 1101 (13).

Divisor=0000 0000 0000 0101 (5).

The division algorithm used in this example requires that the dividend be right justified in one data register and the divisor be properly positioned in another data register such that the LSB of the divisor is one bit position to the left of the MSB bit position of the dividend. To conform to this requirement, micro-code uses the SBC to determine the width of the dividend to be four (4) bits. It uses the barrel shifter 14 (FIG. 1) to shift the divisor four bits to the left.

The division function is then started. This function is performed as a series of shift-subtract-and-load-bit-zero operations on the dividend. The subtraction is a conditional operation. It is executed if the output of a CO (carry-out) flip-flop (not shown) from the last subtraction is "1". Otherwise it is executed as an addition operation. The load-bit-zero part of the operation is done after each subtraction (or addition). It replaces bit zero of the dividend by the value from the new CO. Since the divisor is shifted four bit positions, four shift-subtract-and-load-bit-0 operations must be performed. The ALU in this example performs a shift-subtract-and-load-bit-0 operation in a single clock.

Unlike the multiplication case, a special "restore" operation is performed at the end of a division function before the final result is available. This restore operation is basically a conditional addition operation. It adds the divisor into the dividend if the output of the CO flip-flop at the end is "0"; otherwise, it does nothing.

The divide function is illustrated below on a clock by clock basis. Note that the SO (Shift Out) flip-flop is not used here and the CO flip-flop must be initialized to a one at the beginning. Note that the divisor is 0000 0000 0101 0000 after being shifted 4 bits to the left. Its twos-complement is 1111 1111 10110000. Subtracting the divisor from the dividend is accomplished by adding this twos-complement value into the dividend.

| Step | CO | Dividend | Divisor |
|---|---|---|---|
| initial state clock #1 | 1 | 0000 0000 0000 1101 | 0000 0000 0101 0000 |
| shift | | 0000 0000 0001 1010 | |
| subtract | 0 | 1111 1111 1011 0000 1111 1111 1100 1010 | |
| load bit 0 | | 1111 1111 1100 1010 | |

-continued

| Step | CO | Dividend | Divisor |
|---|---|---|---|
| clock #2 | | | |
| shift | | 1111 1111 1001 0100 | |
| | | 0000 0000 0101 0000 | |
| subtract—> add | 1 | 1111 1111 1110 0100 | |
| load bit 0 | | 1111 1111 1110 0100 | |
| clock #3 | | | |
| shift | 0 | 1111 1111 1100 1000 | |
| | | 0000 0000 0101 0000 | |
| subtract—> add | 0 | 0000 0000 0001 1000 | |
| load bit 0 | | 0000 0000 0001 1001 | |
| clock #4 | | | |
| shift | | 0000 0000 0011 0010 | |
| | | 1111 1111 1011 0000 | |
| subtract | 0 | 1111 1111 1110 0010 | |
| load bit 0 | | 1111 1111 1110 0010 | |
| clock #5 | | | |
| restore—> add | 1 | 0000 0000 0101 0000 | |
| | | 0000 0000 0011 0010 | |

The result of the division is extracted from the final dividend word. The quotient is taken from the area occupied by the original dividend, i.e., bits 3 to 0. The remainder is taken from the rest of the word., i.e., bits 15 to 4.

In sum, the SBC 10 (FIG. 1) provides the capability to determine the number of significant bits in an input word in one (1) clock. If the microcode had to perform this function without the SBC, it would take many clocks. In a design without the SBC, the micro-code must use other hardware resources, such as the ALU and/or a shifter, to determine the number of significant bits by scanning the input word from the MSB to the LSB and eliminating the insignificant bits (i.e., leading zeros) one at a time. It usually takes more than one clock to eliminate each insignificant bit.

The SBC 10 reduces the time required for a typical multiplication or division function by up to 50%. A typical implementation of a low cost multiplier/divider needs X·Y clocks to perform a multiplication or division, where "X" is the size (number of bits) of the multiplier and "Y" is the number of clocks required to process a bit, which is implementation dependent. The SBC reduces this clock count to X/2·Y−1 without increasing the cost significantly. (Note: On average, the number of insignificant bits in an X-bit word will be X/2.) When X·Y is much greater than one, which is almost always the case, the time required for a multiplication or a division using the SBC becomes X·Y/2.

With a typical barrel shifter 12 or other type of shifter, micro-code instructions must provide an immediate value X to be used as the number of bit positions to be shifted or rotated. The shifter cannot take a variable generated from a previous calculation as X. The CIOM barrel shifter (made by Unisys Corporation) is enhanced so that it is capable of taking either the calculation result from the SBC or an immediate value from an instruction as X.

EXAMPLE 3: Left-Justification of Multiplier

In the following example, the data in register R10 of register file 18 (FIG. 1) is adjusted. In this example, R10 contains data to be used as the multiplier in a multiplication function. To increase the speed of the multiplication operation, this multiplier is left-justified to eliminate all or most of its leading zero's. (Note that multiplication and division processes benefit from embodiments of the present invention that work on a nibble basis instead of a bit basis. An example of such an embodiment is described below with reference to FIG. 2B. In these alternative embodiments, the number of significant nibbles is determined by the SBC 10.) Three instructions are employed in this example, with each instruction taking one clock cycle to execute.

The first instruction is used to calculate the number of data bits in register R10. (Recall that registers R1–RN are in the register file 18.) This instruction contains the following information:

1. Select R10 to go to register file 18 output port "OUTA".
2. Control multiplexer 20 so that its input at port no. 0 is directed to its output.
3. Control multiplexer 22 so that the input at its port no. 2 is directed to its output.
4. Control register R11 so that it will load data which arrives at the register file input port "INPA".

Items 1 and 2 present the data from register R10 to the SBC 10. Item 3 allows the output of the SBC 10 to return back to the register file 18. Item 4 loads this result into a register. At the end of this instruction, register R11 will contain the result of this calculation, which is the number of significant bits of register R10, adjusted upward to a modulo-4 number.

The second instruction is used to convert the number of significant bits to the number of leading zero bits. This is accomplished by a simple subtraction. The ALU 14 is used to subtract the number in register R11 from 48, where 48 is the word size (total number of bits of a register) of the system. The design permits replacing data on "OUTA" of the register file 18 with an immediate number provided from the instruction register 16. The number 48 can therefore be embedded in the instruction. The second instruction contains the following information:

1. Provide a number 48 through the 18-bit literal field of the instruction.
2. Control mux 20 so that the input at its input no. 1 is directed to its output.
3. Direct R11 to the register file output port ("OUTB").
4. Instruct the ALU 14 to perform an A−B (subtraction) operation.
5. Control mux 22 so that its input at port no. 0 is directed to its output.
6. Direct register R11 to load data arriving at the register file input port "INPA".

Items 1 and 2 present the number 48 to the ALU 14 as the first operand. Item 3 presents R11 to the ALU as the second operand. Item 4 instructs the ALU to subtract the content of R11 from 48. The last two items direct the ALU output back into register R11. At the end of this instruction, register R11 contains the number of leading zero bits in register R10, adjusted downward to a modulo-4 number.

With the third instruction, a left-shift operation is performed on R10 based on the value in R11. This left-shift instruction contains the following information:

1. Direct the content of register R10 to the register file output port "OUTA".
2. Instruct multiplexer 20 to direct the input at its input port no. 0 to its output port.
3. Direct the content of register R11 to the register file output port "OUTB".
4. Control the barrel shifter 12 so that it performs a left-shift based on the number from "OUTB" of register file 18 and fill the LSB's with zero's.

5. Control mux 22 so that the input at its input port no. 1 is directed to its output port.

6. Direct register R10 to load data arriving at register file input port "INPA".

Items 1 and 2 present the content of register R10 to the barrel shifter 12. Item 3 presents the content of R11 to the barrel shifter 12 as a "number of bits to be shifted" parameter. Item 4 provides additional control information to the barrel shifter. Items 5 and 6 direct the output of the barrel shifter to register R10.

After these three instructions are executed, the data in register R10 is left-justified and ready to be used as a multiplier for a fast multiplication function. The second instruction, the subtraction, is only required for preparing a multiplier. For a fast divide operation, this subtraction is not necessary, since the divisor is adjusted according to the number of significant bits of the dividend instead of the number of leading "0" bits.

EXAMPLE 4: Multiply Coding Using The SBC

The following example is a multiply routine employing the present invention. This example is adapted from Section 3.2, titled "Sequential Add-Shift Multiplication," pages 139–143 of the above-referenced "Digital Computer Arithmetic." This example uses the CIOM Sequencer mentioned above.

Since branches on the CIOM take 3 clocks, it is more efficient to implement the SBC 10 as a most significant nibble calculator rather than a most significant bit calculator.

Algorithm

Facts:

1) A branch function takes 3 clocks on the CIOM. That is, when a branch takes place, the branch instruction itself and the two instructions following it will be executed before the branch target instruction is executed.

2) The CIOM ALU has a single bit multiply function which operates as follows: B·A is a 1 bit left shift of A with a conditional add of B (multiplicand) depending on the shift out bit.

3) Multiple CIOM functions can be executed on a single clock.

Assumptions and syntax:

1) R1=Multiplier.

2) R2=Multiplicand.

3) After multiply, R1 contains result of multiplication.

4) A clock ends with a semi-colon (";").

5) Comments are enclosed by /**/.

/* get number of significant nibbles in R3 using SBC */
R3 :=SBC (R1);

/* compute the bit count needed to normalize (left justify) R1 (multiplier) and save in R5 */
R5:=NUMBER_BITS_IN_WORD−R3;

/* compute nibble loop count and save in R4 */
R4:=R3/4;

/* move loop count to counter */
CNTR1:=R4;

/* normalize (left justify) the multiplier using the Barrel Shifter */
R1:=R1 (Left_Shift R5);

/* main multiply loop */

M1
R1:=R1·R2. CNTR1:=CNTR1−1;
R1:=R1·R2, IF (CNTR1·NE·0 GOTO M1);
R1:=R1·R2;
R1:=R1·R2;
(finished)

EXAMPLE 5: Implementation of SBC in CIOM

This embodiment of a CIOM SBC covers input word sizes up to 48 bits. Data word sizes smaller than 48 bits can still use the SBC 10 because the upper (unused) bits are forced to zero.

A 6-bit output word is generated by the SBC. To better integrate with the multiply and divide algorithm, this output word is set to a mod-4 number. The following table shows the SBC output word with regard to the input word.

| Highest Non-Zero Bit Number In Input Word | SBC Output |
| --- | --- |
| no non-zero bit | 0 |
| 3, 2, 1, or 0 | 4 |
| 7, 6, 5, or 4 | 8 |
| 11, 10, 9, or 8 | 12 |
| 15, 14, 13, or 12 | 16 |
| 19, 18, 17, or 16 | 20 |
| 23, 22, 21, or 20 | 24 |
| 27, 26, 25, or 24 | 28 |
| 31, 30, 29, or 28 | 32 |
| 35, 34, 33, or 32 | 36 |
| 39, 38, 37, or 36 | 40 |
| 43, 42, 41, or 40 | 44 |
| 47, 46, 45, or 44 | 48 |

This implementation groups bits of the input word into 4-bit nibbles and uses 4-input "OR" gates for each nibble to determine if that nibble contains a non-zero bit. It then determines the highest non-zero nibble and supplies the nibble number to the output of the SBC. The final output word of the SBC is the nibble number times 4.

FIGS. 2A through 2D depict details of the combinational logic circuitry making up the SBC 10. In the example depicted in FIG. 2A, the circuit calculates the MSB number whereas, in the example of FIG. 2B, the circuit calculates the MSN number.

Figure 2A:
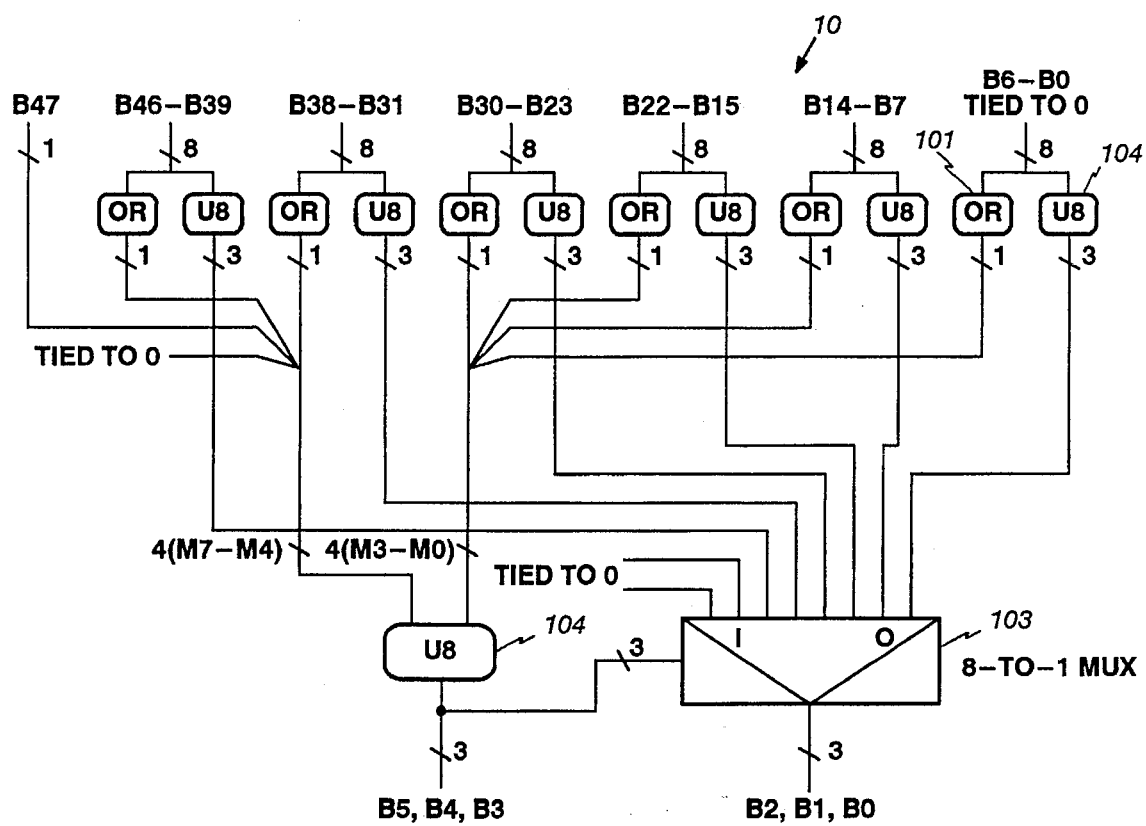
FIG. 2A is a combinational logic diagram of a first embodiment of a Significant Bit Calculator in accordance with the present invention. This embodiment determines the position of the most significant bit (MSB) of the input operand, and provides an output representing the position of the MSB, which is also indicative of the number of significant bits.

In FIG. 2A, the output bits "B0" through "B5" at the bottom of the figure represent the bit position of the most significant non-zero bit. The input bits "B0" through "B47" are shown at the top of the figure. This combinational logic circuitry comprises a plurality of "OR" gates 101 each receiving eight bits of a 48-bit input operand. In addition, the circuitry 10 comprises a mux 103, and an eight-bit priority encoder 104 (U8). The eight-bit priority encoder 104 is described below with reference to FIGS. 2C and 2D.

The output of the circuitry depicted in FIG. 2A is described by the following table.

| Highest Non-Zero Bit In Input Word | Output |
| --- | --- |
| none | 0 |
| 0 (i.e., bit B0) | 1 (one significant bit) |
| 1 | 2 |
| 2 | 3 |
| . . . | . . . |
| N | N + 1 |
| . . . | . . . |

| Highest Non-Zero Bit In Input Word | Output |
| --- | --- |
| 46 | 47 |
| 47 (bit B47) | 48 (a total of 48 significant bits) |

Figure 2B:
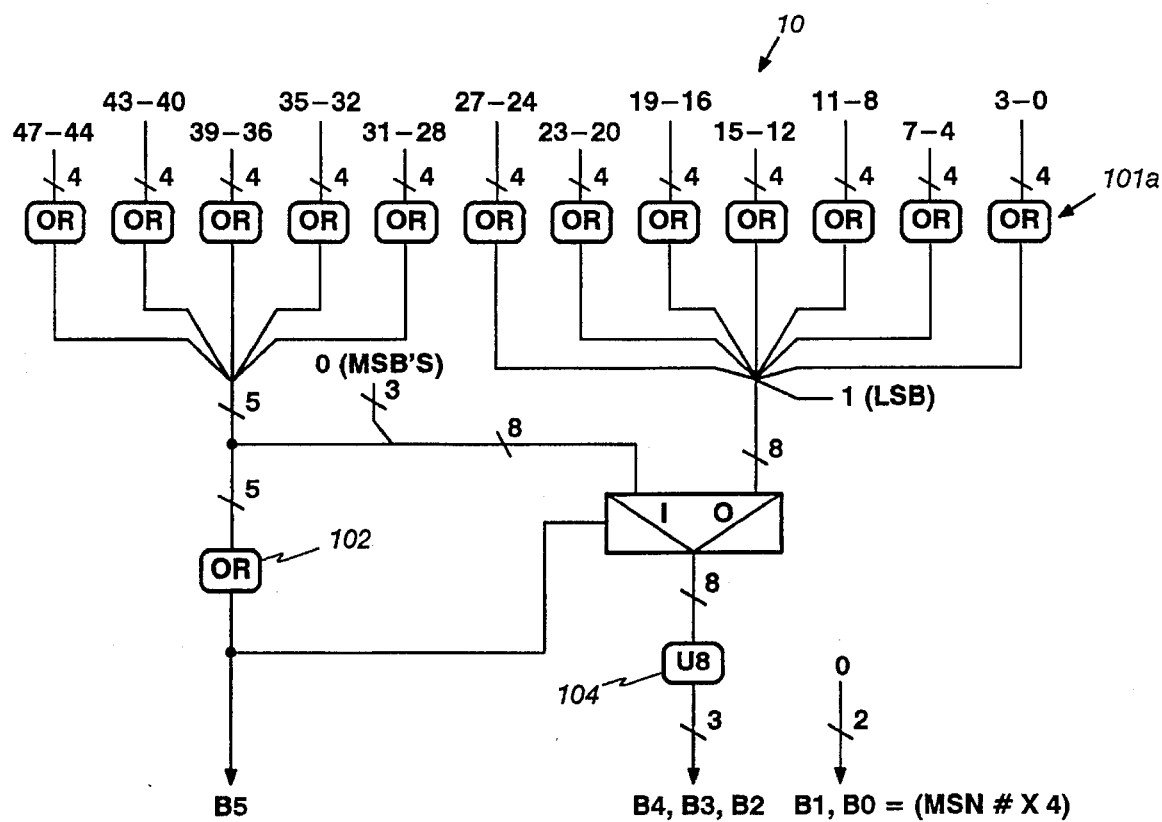
FIG. 2B is a combinational logic diagram of a second embodiment of a Significant Bit Calculator in accordance with the present invention. This embodiment determines the position of the most significant nibble (MSN) of the input operand, and provides an output representing the MSN number times four (MSN#·4).

In FIG. 2B, the output bits "B0" through "B5" represent the bit position of the MSN. Bits "B1" and "B0" are set to "0" to multiply the output by four (i.e., to shift the output left by two bit positions).

Referring to FIG. 2B, one presently preferred embodiment of an SBC that determines the number of significant nibbles is designated generally 10'. This combinational logic circuitry comprises a plurality of "OR" gates 101a each receiving four bits of a 48-bit input operand. In addition, the circuitry 10' comprises another "OR" gate 102, a mux 103a, and an eight-bit unit 104, or U8. The output of the circuitry 10' includes six bits, denoted "B0" through "B5". As mentioned above, in this example, B0 and B1 are set to "0", so that the output represents the most significant nibble number times four (MSN no. ·4).

Figure 2C:
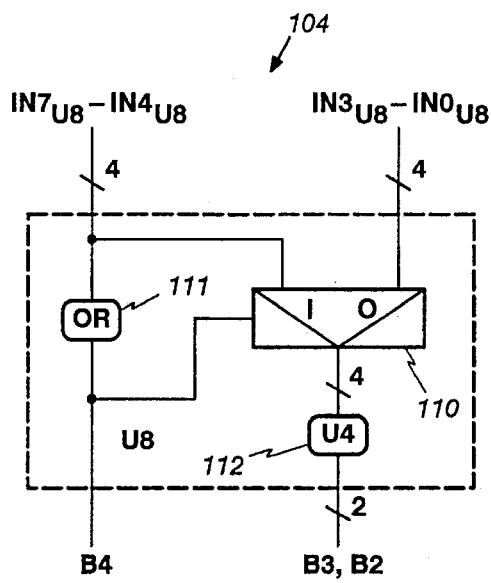
FIG. 2C is a schematic diagram of the 8-bit unit (priority encoder) labelled "U8" in FIGS. 2A and 2B.

The eight-bit unit 104 is shown in detail in FIG. 2C. As shown, this unit includes a mux 110, an "OR" gate 111, and a four-bit unit 112. The output of the eight-bit unit is bits B2 through B4.

Figure 2D:
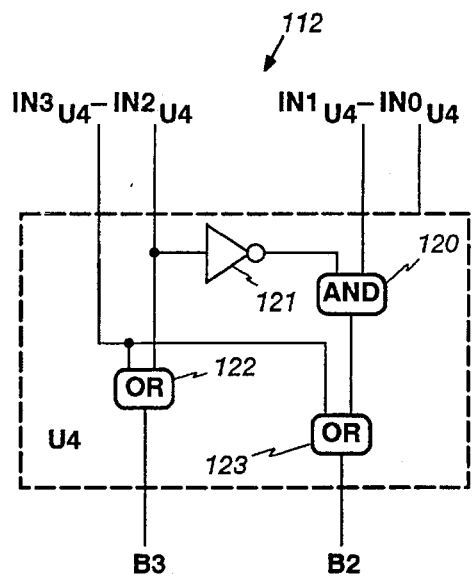
FIG. 2D is a schematic diagram of the 4-bit unit (priority encoder) labelled "U4" in FIG. 2C.

The details of the four-bit unit 112, or U4, are shown in FIG. 2D. As shown, the four-bit unit includes an "AND" gate 120, an inverter or "NOT" gate 121, and two "OR" gates, 122, 123. The four input bits, "IN0" to "IN3" are provided by the mux 110 of the eight-bit unit. These bits will be bits IN0 to IN3 or bits IN4 to IN7 of the eight-bit unit 104, depending on the state of the mux 110. The output of the four-bit unit 112 includes bits B2 and B3.

The following table is a truth table for U4.

| IN3 | IN2 | IN1 | IN0 | B3 | B2 |
| --- | --- | --- | --- | --- | --- |
| 0 | 0 | 0 | 0 | 0 | 0 |
| 0 | 0 | 0 | 1 | 0 | 0 |
| 0 | 0 | 1 | X | 0 | 1 |
| 0 | 1 | X | X | 1 | 0 |
| 1 | X | X | X | 1 | 1 |

The logic equations for U4 are (note that the terms "IN#" refer to inputs to the U4 and U8 circuits):

$B3 = IN3 + IN2;$ $B2 = IN3 + IN2' \cdot IN1.$

The following table is a truth table for U8.

| IN7 | IN6 | IN5 | IN4 | IN3 | IN2 | IN1 | IN0 | B4 | B3 | B2 |
| --- | --- | --- | --- | --- | --- | --- | --- | --- | --- | --- |
| 0 | 0 | 0 | 0 | 0 | 0 | 0 | 0 | 0 | 0 | 0 |
| 0 | 0 | 0 | 0 | 0 | 0 | 0 | 1 | 0 | 0 | 0 |
| 0 | 0 | 0 | 0 | 0 | 0 | 1 | X | 0 | 0 | 1 |
| 0 | 0 | 0 | 0 | 0 | 1 | X | X | 0 | 1 | 0 |
| 0 | 0 | 0 | 0 | 1 | X | X | X | 0 | 1 | 1 |
| 0 | 0 | 0 | 1 | X | X | X | X | 1 | 0 | 0 |
| 0 | 0 | 1 | X | X | X | X | X | 1 | 0 | 1 |
| 0 | 1 | X | X | X | X | X | X | 1 | 1 | 0 |
| 1 | X | X | X | X | X | X | X | 1 | 1 | 1 |

The logic equations for U8 are:

$B4 = IN7 + IN6 + IN5 + IN4;$ $B3 = IN7 + IN6 + B4' \cdot (IN3 + IN2);$ $B2 = IN7 + IN6' \cdot IN5 + B4' \cdot (IN3 + IN2' \cdot IN1);$ where the apostrophe (') refers to the "NOT" function (i.e., inversion).

EXAMPLE 6: Modification of a Barrel Shifter

The CIOM barrel shifter is enhanced to allow the use of a variable from a data register to provide "X" which is the number of bit positions to be shifted or rotated. This enhancement allows the barrel shifter to use the result of the SBC, which is stored into a data register by the SBC, on a data word to position the word for a multiplication or division function. The multiply coding example described above shows that the multiplier must be left justified before performing the multiplication. For a division function, the divisor must be left justified.

Figure 3:
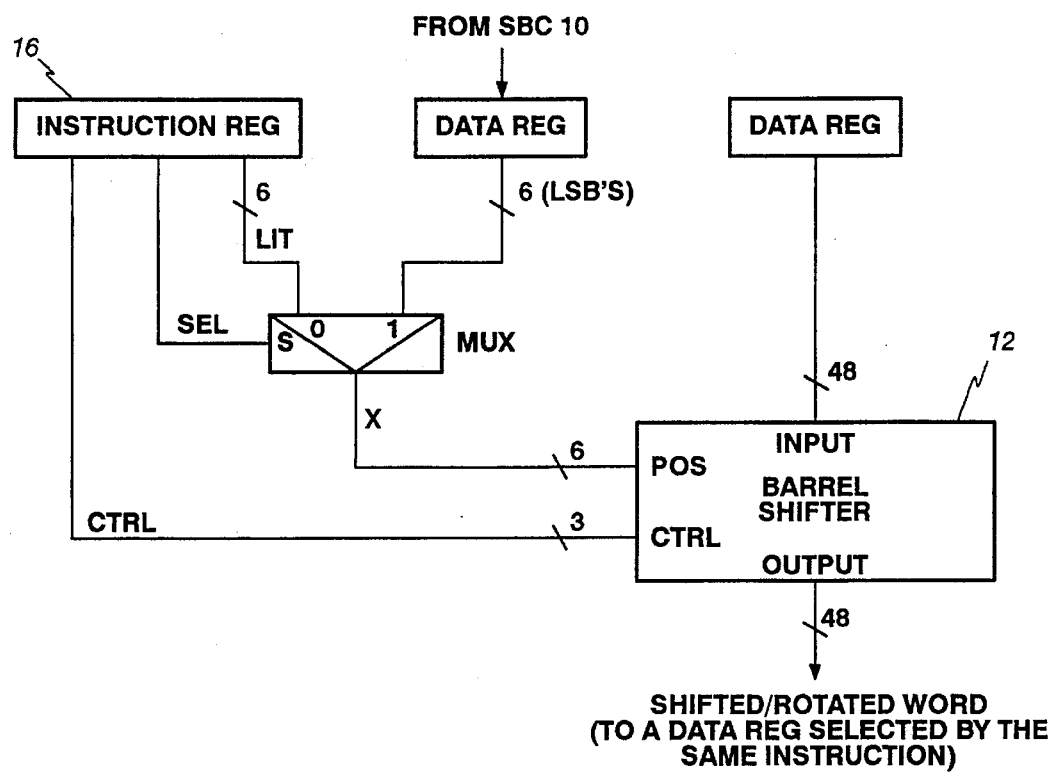
FIG. 3 is a block diagram of second embodiment of a data processor comprising a Significant Bit Calculator in accordance with the present invention.

As shown in FIG. 3, the number of bit positions "X" that the input operand must be shifted is provided via a mux, which in turn is controlled via an instruction register 16. The value "X" is provided to the mux via a data register. Another data register provides the input operand to the barrel shifter. In FIG. 3, "X" represents the number of bits to be shifted/rotated. "CTRL" provides the following information:

1. Whether this is a shift or rotate operation.
2. Direction of shift or rotate.
3. If a shift, whether to fill in "0"s or "1"s.

Finally, the present invention may be employed in other specific forms without departing from the spirit or essential attributes thereof. Accordingly, except where they are expressly so limited, the scope of protection of the following claims is not limited to the presently preferred embodiments described above.

We claim:

1. A combinational logic circuit for determining the position of the most significant bit or nibble in an operand comprising a plurality of bytes, each byte, comprising eight bits and two nibbles, said combinational logic circuit providing a plurality of combinational logic circuit output bits that indicate the position of the most significant bit or nibble, wherein said combinational logic circuit comprises selecting circuitry and a plurality of eight-bit units, each eight-bit unit being operatively coupled to said selecting circuitry and comprising eight input terminals for receiving eight input bite (IN0–IN7) derived from said operand, first logic circuit means, and three output terminals for providing three logic circuit output bits (B2–B4), wherein said logic circuit output bits (B2–B4) are provided to said output terminals by said first logic circuit means, said first logic circuit means setting said logic circuit output bits in accordance with the following logic equations:

$B4 = IN7 + IN6 + IN5 + IN4;$ $B3 = IN7 + IN6 + B4' \cdot (IN3 + IN2);$ $B2 = IN7 + IN6' \cdot IN5 + B4' \cdot (IN3 + IN2' \cdot IN1);$ where the apostrophe (') refers to a "NOT" function; and wherein said selecting circuitry is constructed and arranged in relation to said eight-bit units so that said logic circuit output bits produced by said plurality of eight-bit units form at least part of a set of bits forming a binary number indicative of the number of significant bits or nibbles of said operand, said binary number being utilized as said combinational logic circuit output bits.

2. The combinational logic circuit recited in claim 1, wherein each of said eight-bit units comprises a four-bit unit comprising three input terminals for receiving three input bits $IN1_{U4}$, $IN2_{U4}$, and $IN3_{U4}$, which are derived from the bits (IN0–IN7) of said operand; second logic circuit means, and two output terminals for providing said output bits B2 and B3, wherein said output bits B2 and B3 are provided to said two output terminals by said second logic circuit means, wherein said second logic circuit means sets said two output bits in accordance with the following logic equations:

$B3=IN3_{U4}+IN2_{U4}$;

$B2=IN3_{U4}+IN2'_{U4}\cdot IN1_{U4}$.

3. The combinational logic circuit recited in claim 2, wherein said combinational logic circuit determines the most significant nibble (MSN) position of the selected operand, and said selecting circuitry comprises a plurality of four-input "OR" gates comprising respective output terminals operatively coupled to the input terminals (IN1–IN7) of at least one of said eight-bit units, wherein the input terminals of said "OR" gates receive the bits of the operand.

4. The combinational logic circuit recited in claim 1, wherein said circuit determines the position of the most significant bit or nibble in one cycle of a clock signal.

5. A process for determining the position of the most significant bit or nibble (MSB or MSN) in an operand, comprising the step of:

providing the bits of the operand to an electrical circuit that receives said bits and, in one cycle of a clock signal, generates output bits forming a binary number indicative of the number of significant bits or nibbles of said operand;

wherein said operand comprises a plurality of bytes, each byte comprising eight bits (IN0–IN7), and said electrical circuit comprises a combinational logic circuit that provides a plurality of output bits that indicate the position of the most significant bit or nibble of said operand, and wherein said combinational logic circuit comprises a plurality of eight-bit units, each eight-bit unit comprising:

eight input terminals for receiving eight input bits (IN0–IN7) derived from said operand;

three output terminals for providing three output bits (B2–B4); and logic means for providing said output bits in accordance with the following logic equations:

$B4=IN7+IN6+IN5+IN4$;

$B3=IN7+IN6+B4'\cdot(IN3+IN2)$;

$B2=IN7+IN6'\cdot IN5+B4'\cdot(IN3+IN2'\cdot IN1)$.

6. A process for determining the position of the most significant bit or nibble (MSB or MSN) in an operand, comprising the step of:

providing the bits of the operand to an electrical circuit that receives said bits and, in one cycle of a clock signal, generates output bits forming a binary number indicative of the number of significant bits or nibbles of said operand; and determining the number of significant bits or nibbles by subtracting the outputs of said electrical circuit from a predetermined number representing word size, and then shifting the operand to position the MSB or MSN as required by a prescribed arithmetic algorithm, wherein said operand is shifted to make said operand left-justified;

wherein said operand comprises eight bits (IN0–IN7) and said electrical circuit comprises a combinational logic circuit that provides a plurality of output bits that indicate the position of the most significant bit or nibble of said operand, and wherein said combinational logic circuit comprises an eight-bit unit comprising:

eight input terminals for receiving said eight input bits (IN0–IN7) of said operand;

three output terminals for providing three output bits (B2–B4); and logic means for providing said output bits in accordance with the following logic equations:

$B4=IN7+IN6+IN5+IN4$;

$B3=IN7+IN6+B4'\cdot(IN3+IN2)$;

$B2=IN7+IN6'\cdot IN5+B4'\cdot(IN3+IN2'\cdot IN1)$.

7. A data processing system for performing multiplication or division to compute a result on the basis of first and second operands and a prescribed multiplication or division algorithm, wherein said operands are composed of a predetermined number of binary digits, comprising:

(a) significant bit calculation means for determining the bit position of the most significant non-zero bit or nibble (MSB or MSN) in a selected one of said operands comprising a plurality of bytes, each byte comprising a plurality of bits (IN0–IN7), and for generating output bits forming a binary number indicative of the number of significant bits or nibbles of the selected operand, wherein said significant bit calculation means determines the position of the most significant bit or nibble in the selected operand and provides a plurality of output bits that indicate the position of the most significant bit of nibble, said significant bit calculation means comprising a logic circuit for receiving bits of said operand and providing output bits (B2–B4) in accordance with the following logic equations:

$B4=IN7+IN6+IN5+IN4$;

$B3=IN7+IN6+B4'\cdot(IN3+IN2)$;

$B2=IN7+IN6'\cdot IN5+B4'\cdot(IN3+IN2'\cdot IN1)$;

where the apostrophe (') refers to a "NOT" function; and said logic circuit further comprises circuit means for appropriately outputting selected output bits so as to form at least part of a set of bits forming a binary number indicative of the number of significant bits or nibbles of said operand;

(b) shifter means, operatively coupled to said significant bit calculation means, for shifting the bits of the selected one of said operands so that said most significant bit or nibble is positioned as required by the multiplication or division algorithm; and (c) arithmetic means for performing a multiplication or division operation with said first and second operands, said selected one of said operands having been shifted.

8. The data processing system recited in claim 7, wherein said system comprises a clock providing a clock signal, and said significant bit calculation means comprises a combinational logic circuit means for determining said position of the most significant bit or nibble in one cycle of said clock signal.

9. The data processing system recited in claim 7, wherein said arithmetic means comprises an arithmetic and logic unit (ALU).

10. The data processing system recited in claim 7, wherein said shifter means comprises a barrel shifter.

11. The data processing system recited in claim 7, comprising means for employing said shifter means to left-justify said selected operand.

12. A data processing system for performing multiplication or division to compute a result on the basis of first and second operands and a prescribed multiplication or division algorithm, wherein said operands are composed of a predetermined number of binary digits, comprising:

(a) significant bit calculation means for determining the bit position of the most significant non-zero bit or nibble (MSB or MSN) in a selected one of said operands, and for generating output bits forming a binary number indicative of the number of significant bits or nibbles of the selected operand;

(b) shifter means, operatively coupled to said significant bit calculation means, for shifting the bits of the selected one of said operands so that said most significant bit or nibble is positioned as required by the multiplication or division algorithm; and (c) arithmetic means for performing a multiplication or division operation with said first and second operands, said selected one of said operands having been shifted; wherein said system comprises a clock providing a clock signal, and said significant bit calculation means comprises a combinational logic circuit means for determining said position of the most significant bit or nibble in one cycle of said clock signal;

wherein said combinational logic circuit means provides a plurality of output bits (B0–B5) that indicate the position of the most significant bit or nibble of said operand, and wherein said combinational logic circuit means comprises:

an eight-bit unit ($U_8$) comprising eight input terminals for receiving eight input bits ($IN0_{U8}$–$IN7_{U8}$), which are derived from bits (IN0–IN7) of the operand first logic circuit means, and three output terminals for providing three output bits (B2–B4), wherein said output bits are provided to said output terminals by said first logic circuit means, said first logic circuit means setting said output bits in accordance with the following logic equations:

$B4 = IN7_{U8} + IN6_{U8} + IN5_{U8} + IN4_{U8}$;

$B3 = IN7_{U8} + IN6_{U8} + B4' \cdot (IN3_{U8} + IN2_{U8})$;

$B2 = IN7_{U8} + IN6'_{U8} \cdot IN5_{U8} + B4' \cdot (IN3_{U8} + IN2'_{U8} \cdot In1_{U8})$;

where the apostrophe (') refers to the "NOT" function, and wherein said output bits form at least part of a set of bits indicative of the number of significant bits or nibbles of said operand.

13. The data processing system recited in claim 12, wherein said eight-bit unit (U8) comprises a four-bit unit (U4) comprising three input terminals for receiving three input bits $IN1_{U4}$, $IN2_{U4}$ and $IN3_{U4}$, which are derived from the bits (IN0–IN7) of the operand; second logic circuit means, and two output terminals for providing output bits B2 and B3, wherein said output bits B2 and B3 are provided to said two output terminals by said second logic circuit means, said second logic circuit means setting said two output bits in accordance with the following logic equations:

$B3 = IN3_{U4} + IN2_{U4}$;

$B2 = IN3_{U4} + IN2'_{U4} \cdot IN1_{U4}$.

14. The data processing system recited in claim 12, wherein said combinational logic circuit means determines the most significant nibble (MSN) position of the selected operand, and further comprises a plurality of four-input "OR" gates comprising respective output terminals operatively coupled to the input terminals ($IN1_{U8}$–$IN7_{U8}$) of said eight-bit unit, wherein the input terminals of said "OR" gates receive the bits of the selected operand.

* * * * *